(12) United States Patent
Carraro et al.

(10) Patent No.: US 6,226,009 B1
(45) Date of Patent: May 1, 2001

(54) DISPLAY TECHNIQUES FOR THREE DIMENSIONAL VIRTUAL REALITY

(75) Inventors: Gianpaolo U. Carraro, Red Bank; James Robert Ensor, Middletown, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/107,566

(22) Filed: Jun. 29, 1998

(51) Int. Cl.[7] .................................................. G06T 17/00
(52) U.S. Cl. ........................ 345/428; 345/972; 345/473
(58) Field of Search ..................................... 345/473, 340, 345/972, 427, 302, 428; 701/212, 208; 382/285

(56) References Cited

U.S. PATENT DOCUMENTS 4,714,918 * 12/1987 Barker et al. ......................... 345/123
5,261,041 * 11/1993 Susman ................................ 345/473
6,064,389 * 5/2000 Berry et al. .......................... 345/419

OTHER PUBLICATIONS

U.S. application No. 08/938304, Alfred Vaino Aho, filed Sep. 26, 1997.
U.S. application No. 60/055384, Alfred Vaino Aho, filed Aug. 4, 1997.
U.S. application No. 08/869056, Gianpaolo U. Carraro, filed Jun. 4, 1997.
U.S. application No. 08/906214, Gianpaolo U. Carraro, filed Aug. 4, 1997.
U.S. application No. 08/906215, Gianpaolo U. Carraro, filed Aug. 4, 1997.
U.S. application No. 09/098218, Gianpaolo U. Carraro, filed Jun. 16, 1998.
U.S. application No. 08/405062, Sudhir Raman Ahuja, filed Mar. 16, 1995.
U.S. application No. 08/502492, Sudhir Raman Ahuja, filed Apr. 22, 1993.
U.S. application No. 08/906216, James Robert Ensor, Aug. 4, 1997.
U.S. application No. 09/107059, John T. Edmark, filed Jun. 30, 1998.
U.S. application No. 09/108029, John T. Edmark, filed Jun. 30, 1998.

* cited by examiner

Primary Examiner—Mark Zimmerman
Assistant Examiner—Philip H. Stevenson
(74) Attorney, Agent, or Firm—Eugene J. Rosenthal

(57) ABSTRACT

A limitation of a three dimensional world in which objects in the distance may be represented in only two dimensions as a video on a screen is that when an object within the field represented by the video undergoes a trajectory that takes it to a location in the world that is not represented by the video but instead is a location which is represented by computer graphics, namely, any portion of the object that is no longer on the video screen disappears. To overcome this limitation, when an object within the field represented by the video undergoes a trajectory that takes it to a location in the world that is not represented by the video on the video screen as currently configured, i.e., shaped and sized, the configuration of the screen is changed so that the object can continue to be displayed as video. The size and/or shape of the video screen is changed. For example, the video screen may be increased in overall size, or it may "grow" a specific appendage screen on which the object is displayed as video. If an additional appendage screen is "grown", it need not be contiguous with the screen as previously configured. Such appendage screens may sized, shaped, and located so that, the video object continues to be visible rather than becoming invisible because it is no longer displayable within the video screen.

27 Claims, 5 Drawing Sheets

(4 of 5 Drawing Sheet(s) Filed in Color)

DISPLAY TECHNIQUES FOR THREE DIMENSIONAL VIRTUAL REALITY

TECHNICAL FIELD

This invention relates to the integration of computer graphics and video to provide a realistic three dimensional virtual reality experience.

BACKGROUND OF THE INVENTION

The display of a three dimensional world to a viewer requires considerable computation power, and it is typically costly to develop the necessary highly detailed models required for doing so. In order to simplify the problem, a portion of the world that is in the distance may be represented in only two dimensions as a video displayed on a surface, e.g., a screen. By video it is meant the common usage of the term, such as the placing or projecting of predefined images on the surface, e.g., the electronic version of filmed moving pictures. Thus, such a world is essentially truncated in length to the screen on which the video is displayed. A great reduction in computation power and cost can be achieved by such an arrangement.

SUMMARY OF THE INVENTION

We have recognized that a limitation of such a world occurs when an object within the field represented by the video undergoes a trajectory that takes it to a location in the world that is not represented by the video on the video screen as currently configured, i.e., shaped and sized, but instead is a location which is represented by computer graphics, namely, that any portion of the object that is no longer on the video screen disappears. More specifically, the object disappears as it exits the screen. Therefore, in accordance with the principles of the invention, when an object within the field represented by the video undergoes a trajectory that takes it, or a portion thereof, to a location in the world that is not represented by the video but instead is a location which is currently represented by computer graphics, the configuration of the screen is changed so that the object can continue to be displayed as video. In accordance with one aspect of the invention, the size and/or shape of the video screen is changed. For example, the video screen may be increased in overall size, or it may "grow" a specific appendage screen on which the object is displayed as video. In accordance with another aspect of the invention, if an additional appendage screen is "grown", it need not be contiguous with the screen as previously configured. Such appendage screens may be sized, shaped, and located so that the video object continues to be visible, e.g., in front of, or to the side of, the previous shape of the video screen, rather than becoming invisible because it is no longer displayable within the video screen.

BRIEF DESCRIPTION OF THE DRAWING

The file of this patent contains at least one drawing executed in color. Copies of this patent with color drawing (s) will be provided by the Patent and Trademark Office upon request and payment of the necessary fee.

In the drawing.

DETAILED DESCRIPTION

Figure 1:
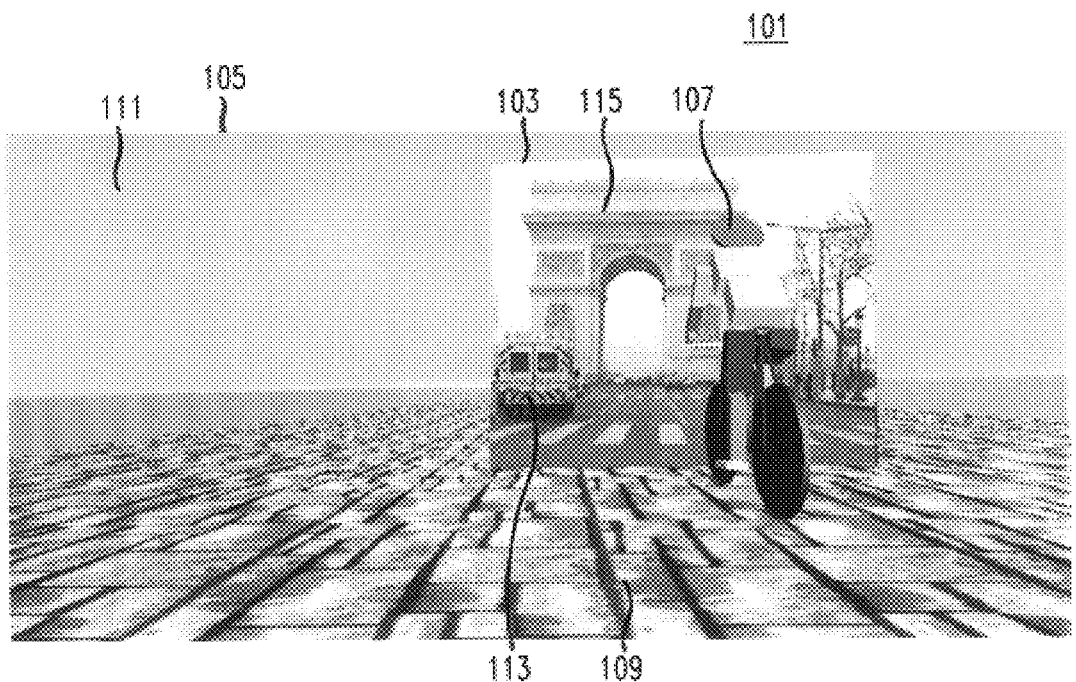
FIGS. 1–5 show an example of that which a user sees according to the invention when an object, that is displayed as video on a video screen of a world that has a portion of the world distant from the point of view of the user represented in only two dimensions as a video on the video screen, undergoes a trajectory that takes at least a portion of it to a location in the world that is not represented by the video but instead is a location in the world that is represented by computer graphics, and such an object or portion is made to yet be visible to the user by changing the configuration of the screen so that the object can continue to be displayed as video.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that the various flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

To better illustrate the invention, FIGS. 1–5 show an exemplary virtual world that is represented in multiple portions. One portion of the world is relatively distant from the point of view of the user and is represented in only two dimensions as a video on a video screen. The other portion of the world is relatively close to the point of view of the user and is not represented by video but instead is represented by computer graphics. Each of FIGS. 1–5 is a different view of the virtual world which is designed to help show that which a user sees according to the invention when an object, that is displayed as video on the video screen undergoes a trajectory that takes at least a portion of it to a location in the computer graphics portion of the virtual world, and such an object or portion is made to yet be visible to the user by changing the configuration of the screen so that the object can continue to be displayed as video. For simplification of terminology purposes, a portion of an object may simply be referred to as an object, since any portion of an object may be considered an object in its own right.

FIG. 1 shows world 101, which is the Champs Elysees in Paris, France, as one approaches La Place de l'Etoile in the center of which is the Arc de Triomphe. World 101 is divided into two portions, video screen 103, on which is shown the current frame of a video and the remainder of the world 105, which is represented using computer graphics techniques, and is thus referred to herein as computer graphics part (CG Part) 105. The current frame of video being displayed on video screen 103 includes police van 113 and Arc de Triumph 115. Within CG Part 105 there are various elements, such as bicyclist 107, representing the user, road 109, and sky 111.

Note that the viewpoint of the user is actually behind the representation of the user in the form of bicyclist 107. Also note that police van 113, which is part of the current video frame being shown on video screen 103, is moving slower than bicyclist 107, so that police van 113 will eventually be passed by bicyclist 107 as he continues to ride toward Arc de Triumph 115.

Figure 2:
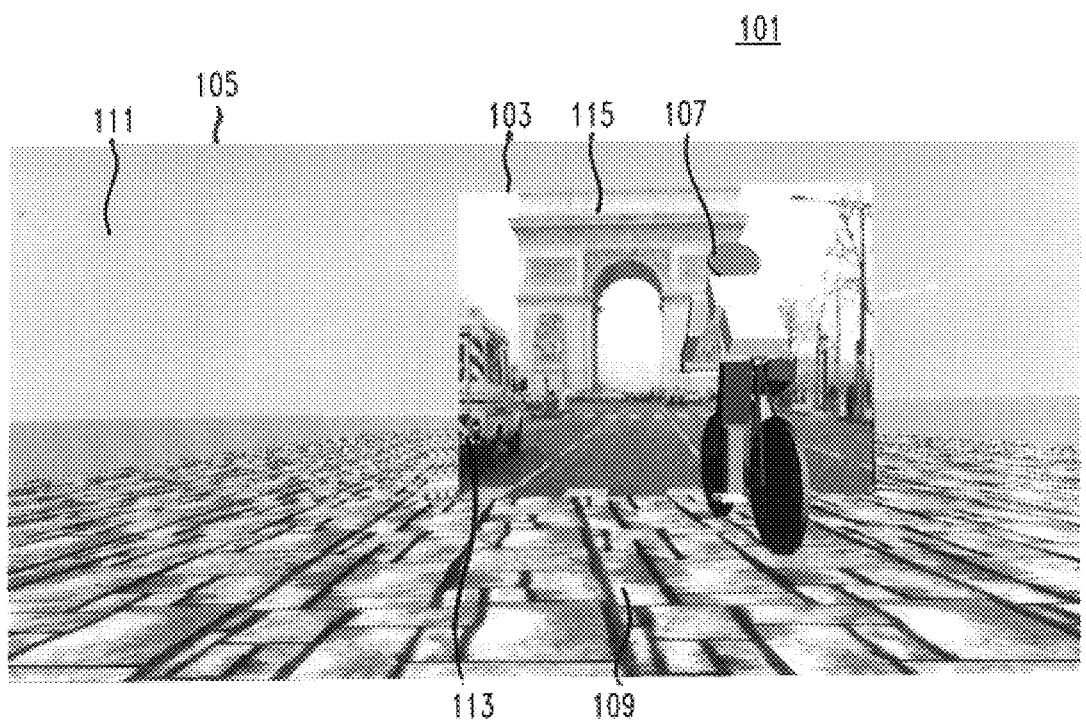

FIG. 2 shows world 101 of FIG. 1, but at a later time. At the time of FIG. 2, the frame of video being shown on screen 103 is from a view closer to Arc de Triumph 115. Such a frame may have resulted, for example, from moving the camera that captured the video closer to Arc de Triumph 115. As a result of the camera location when the frame of video on screen 103 that is shown in FIG. 2 was taken, only a portion of police van 113 was captured video frame. The rest of the police van 113 was out of view of the camera, and hence is not visible within the current frame of video on screen 103 that is shown in FIG. 2. However, from the viewpoint of the user, looking at world 101 as it appears in FIG. 2, the remaining portion of police van 113 should be visible, notwithstanding that it is no longer within the boundaries of video screen 103. Thus, the problem of the prior art is clearly seen.

Figure 3:
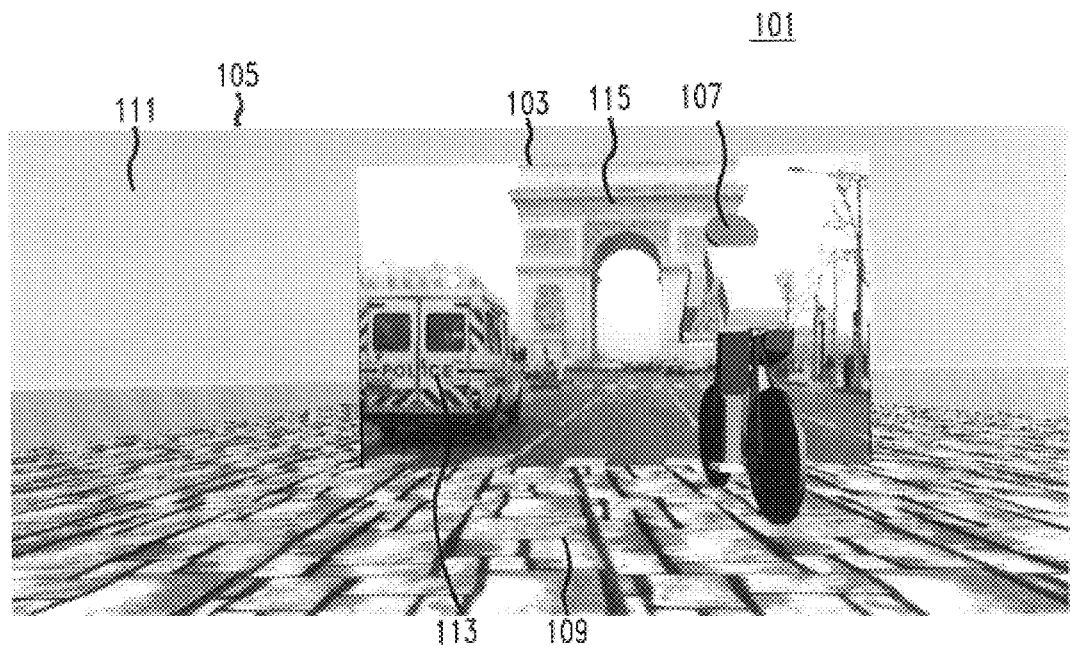

To avoid this problem, in accordance with the principles of the invention, the remaining portion of police van 113 is displayed by reconfiguring video screen 103 so that the entire police van 113 may be displayed thereon as video. This is shown in FIG. 3. More specifically, FIG. 3 shows the same view as in FIG. 2, but video screen 103 has been reconfigured to be larger than it was previously. Onto enlarged video screen 103 is projected the video information that was not previously projected onto video screen 103. In particular video of the entire police van 113 is now projected onto video screen 103. The additional information that is projected onto video screen 103 in this embodiment may have been originally taken as part of the video when it was originally filmed but the video was cropped to fit on video screen 103, for any number of reasons, e.g., to reduce transmission bandwidth or to increase the size of CG part 105. Alternatively, the additional video information may be retrieved or developed when needed, based on the video information available in, or in association with, the current frame and/or other frames of the video.

Figure 4:
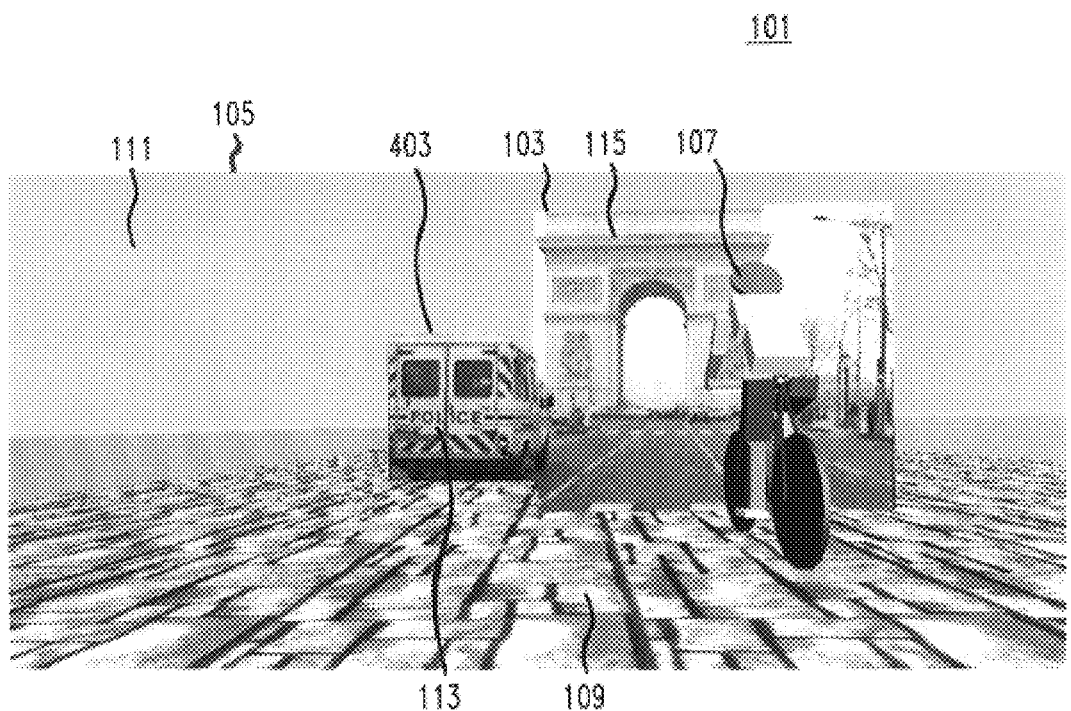

FIG. 4. shows another embodiment of the invention. In FIG. 4 is shown essentially the same view as in FIG. 2, but an appendage screen 403 is grown from video screen 103. In other words, the size of the "main" portion of video screen 103 in FIG. 2 is the same as in FIG. 2 but there is added to the formerly rectangular screen 103 further screen area in the form of appendage screen 403. Video of the police van 113 is projected onto appendage screen 403. Note that some or all of police van 113 may be projected onto appendage screen 403, as may be any other necessary background or foreground information that is included in the video. The additional information that is projected onto appendage screen 403, in this embodiment may have been originally taken as part of the video when it was originally filmed but the video was cropped to fit on video screen 103 before growing appendage screen 403, for reasons such as described above. Alternatively, the additional video information may have been developed later, based on the video information available in, or in association with, the current frame and/or other frames of the video. Also note that the appendage screen may be any shape and need not be rectangular.

Figure 5:
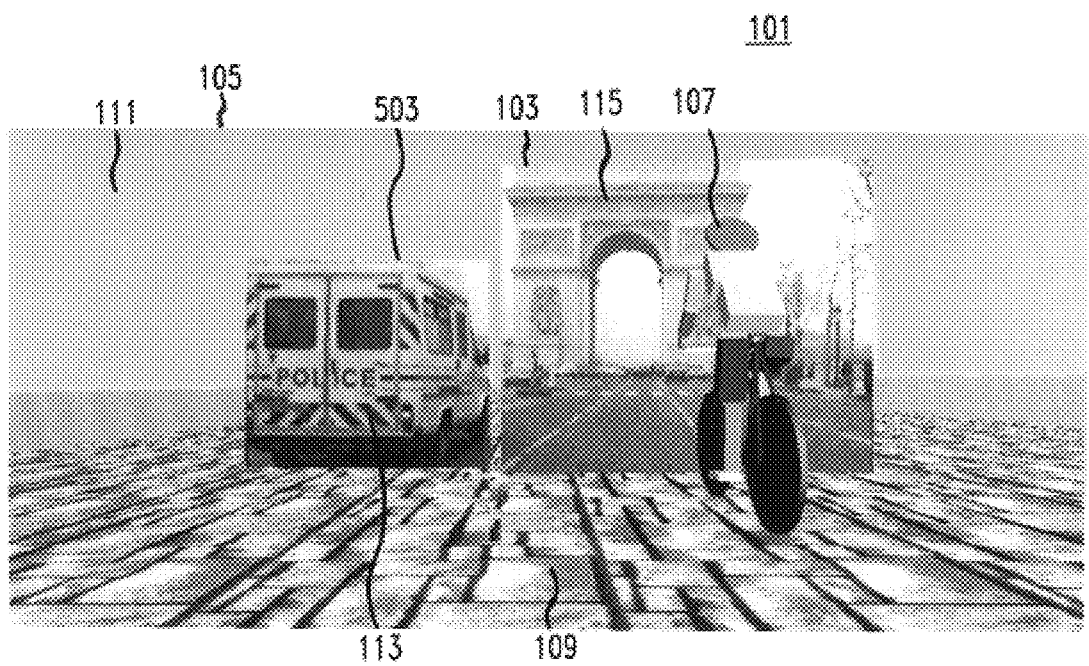

FIG. 5 shows world 101 of FIG. 1, but at a time even later than that of FIG. 4. Thus, at the time of FIG. 5, the frame of video being shown on screen 103 is from a view still closer to Arc de Triumph 115 than that of FIG. 4. As a result of the camera location when the frame of video on screen 103 that is shown in FIG. 5 was taken, none of police van 113 is visible within the current frame of video on screen 103 as configured in FIGS. 1 or 2. However, from the viewpoint of the user, looking at world 101 as it appears in FIG. 5, police van 113 should be visible to the user's left, notwithstanding that it is no longer within the boundaries of video screen 103. Therefore, in accordance with the principles of the invention, police van 113 is displayed as video on appendage screen 503 which is a portion of main video screen 103 but which is detached therefrom. In a typical embodiment of the invention, at least a portion of police van 113 will continue to be displayed as video on appendage screen 503 until police van 113 passes completely from the user's viewpoint. Note that appendage screen 503 may be changed in size, and the frame of video displayed thereon transformed in size, location and orientation, so as to better realistically display police van 113.

Figure 6:
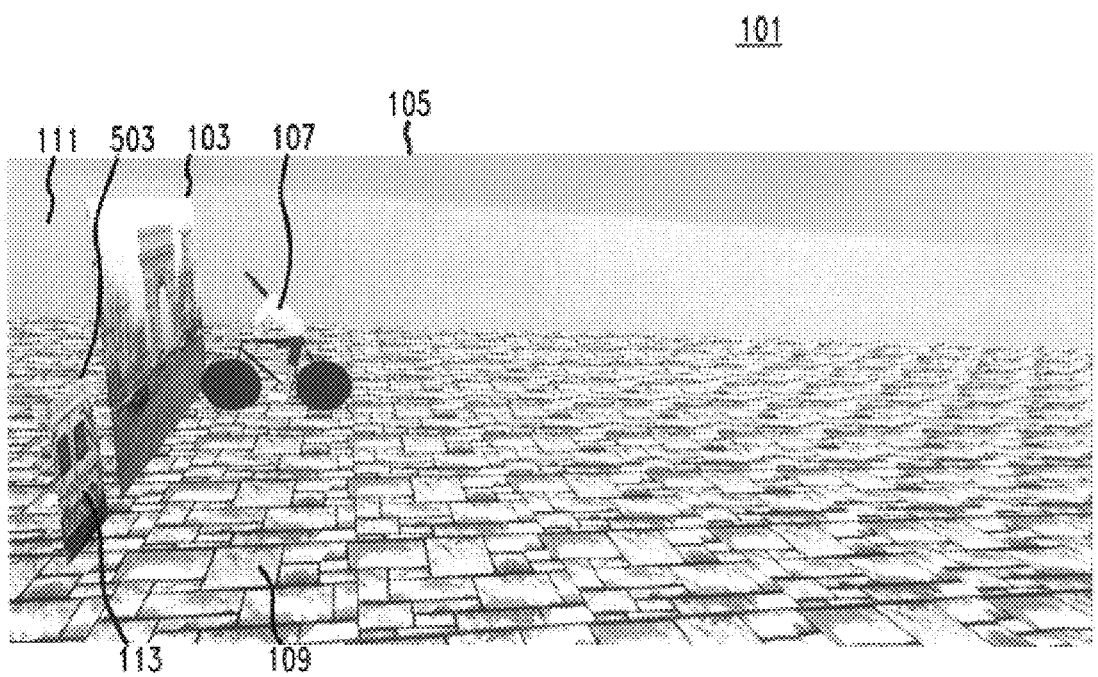
FIGS. 6 and 7 show possible side views of the world shown in FIG. 5.
Figure 7:
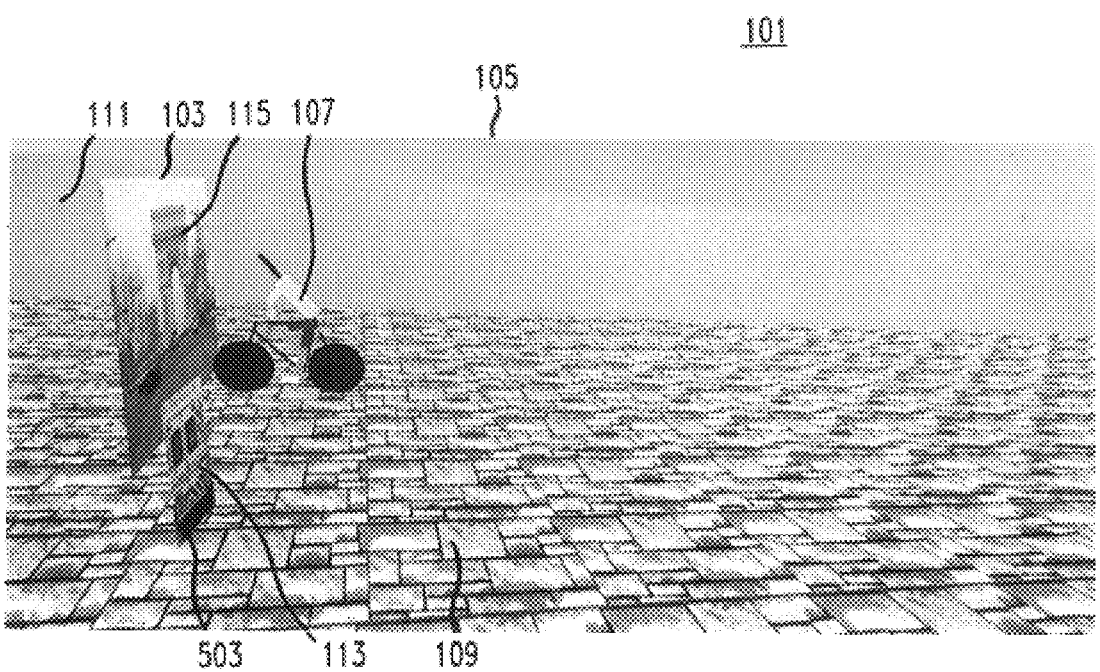

FIG. 6 shows one possible side view of world 101 as shown in FIG. 5. This view, which is essentially only for pedagogical purposes, demonstrates that video screen 103 and appendage screen 503 may be substantially coplanar. On the other hand, video screen 103 and appendage screen 503 need not be substantially coplanar, and a possible side view of world 101 as shown in FIG. 5 where video screen 103 and appendage screen 503 are not substantially coplanar is shown in FIG. 7

Note that the techniques of the invention as shown in FIGS. 3 through 7 may be combined, as necessary and appropriate, for any frame.

Figure 8:
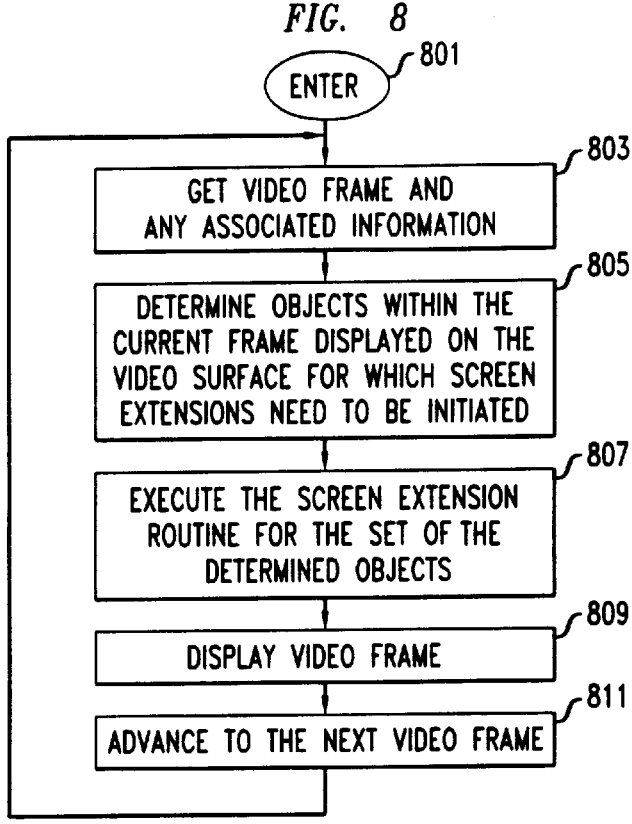
FIG. 8 shows an exemplary process by which a video screen is modified so that any object within the field represented by the video surface that, due to its projected motion is to be displayed in the three dimensional world, e.g., in front of, to the side of, above, or below, the video surface, will, as a result of the modification, continue to be displayed as video on a newly-formed or reshaped extension to the original video screen in accordance with the principles of the invention.

FIG. 8 shows an exemplary process by which a video screen is modified so that any object within the field represented by the video surface that, due to its projected motion is to be displayed in the three dimensional world, e.g., in front of, to the side of, above, or below, the video surface, will, as a result of the modification, continue to be displayed as video on a newly-formed or reshaped extension to the original video screen, in accordance with the principles of the invention. In typical embodiments of the invention, the objects to be monitored, and their location in the video and the time associated with their position within the video is known, so that the time and extent of the screen modifications are known. However, the techniques of the invention may be employed with computers and software that are sufficiently sophisticated to track recognizable objects within the video surface and to modify the configuration of the video surface in response to the movements of these objects.

The process is entered in step 801 when the user selects a particular world to view and the first frame of the video therefor is to be displayed to a user. In step 803, the video frame to be displayed is retrieved. This may be achieved by retrieving data representing the frame that is pointed to by a pointer. Such a frame pointer is set initially, e.g., in step 801, to point to the first frame of the video. Next, in step 805, it is determined if there are any objects within the current video frame that are to be displayed on the video screen for which screen modifications need to be performed. As noted, this may be achieved by employing additional information associated with the frame that describes any objects that need to be monitored. Such additional information may also include data necessary to modify the video screen. Alternatively, this step may be achieved by analyzing the content of the video frame, perhaps in conjunction with prior frames and future frames, to determine data necessary to monitor the object as well as data that determines how to modify the video screen. In addition, the viewpoint given to the user by the overall display may be incorporated in the determination. Such a viewpoint is determined by camera controls, which may be set by the user. Of course, a combination of the foregoing techniques may also be employed. In step 807, a computer graphics display engine routine is initiated for performing the modifications determined in step 805.

The video frame is displayed in step 809. In step 811 the next video frame is advanced to, provided that there is one. This may be achieved by incrementing or otherwise updating the value of the frame pointer. Of course, the next video frame could also be a previous frame, for example, if the bicyclist allowed his bicycle to coast backwards downhill. Thereafter, control passes back to step 803 and the process continues as described above.

Figure 9:
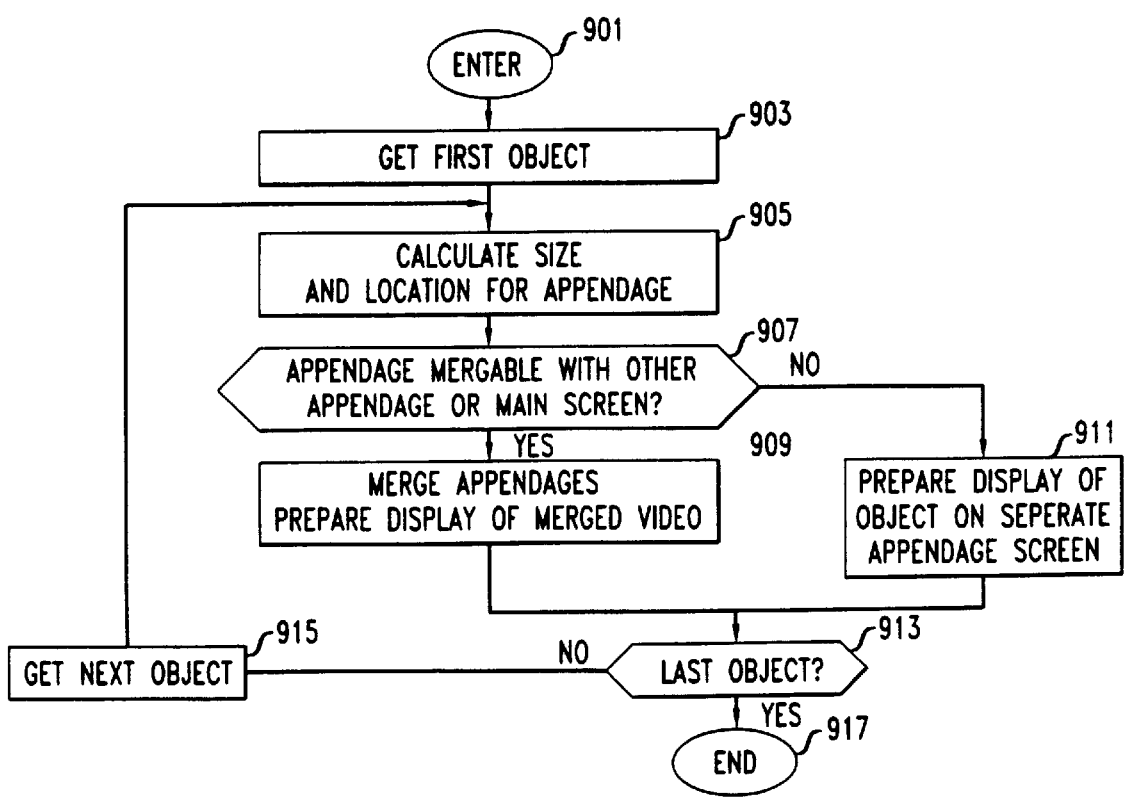
FIG. 9 shows additional details for performing the screen modifications called for in one of the steps of FIG. 8.

FIG. 9 shows an additional details for performing the functionality of step 807 of FIG. 8. The process is entered in step 901 upon completion of performance of step 805 (FIG. 8). Thereafter, in step 903 (FIG. 9), the first object of the set of objects determined in step 805 (FIG. 8) is obtained. Next, in step 905 (FIG. 9), the size and location for the appendage screen is calculated. This calculation is performed taking into account, as will be appreciated by those of ordinary skill in the art, a) the location where the object to be displayed should be at in the frame of video to be displayed and b) the information available about the size of the object Conditional branch point 905 then tests to determine if the just determined appendage screen can be merged with another appendage screen or the "main" video screen. If the test result in step 907 is YES, control passes to step 909, and the just calculated appendage screen is merged with either another appendage screen which is substantially adjacent to it or the main video screen. Also, the section of the video information which is to be displayed on the merged appendage screens, or merged appendage screen and main screen, is prepared. Alternatively, if the test result in step 907 is NO, control passes to step 911, which prepares the section of the video information which is to be displayed on the separate appendage screen. Note that such preparation may include any scaling or other processing of the video necessary to enhance the appearance of the object so that the viewer perceives the object to continue to exist as would naturally be expected.

Upon completion of steps 909 or 911 control passes to conditional branch point 913, which tests to determine if the object for which an appendage screen was prepared is the last object for which an appendage screen needs to be prepared for this frame. If the test result in step 913 is NO, control passes to step 915, to get the next object for which an appendage screen needs to be prepared. Control then passes back to step 905 and the process continues as described above. If the test result in step 913 is YES control passes to step 917 and the process is exited, so that control is passed to step 809 (FIG. 8).

Table 1 shows pseudocode for performing the process of FIG. 9. To execute this pseudocode, prior to performing step 801, it is necessary that there be supplied certain control parameters. These parameters include the following control variables:

expansion_bounds which controls how far appendage screens expand consolidate_regions which controls appendage screen consolidations consolidation_range which controls how close appendage screens must be to be eligible for consolidation tear_off_regions which controls appendage screen breakaways render_bounds which controls how far break-away appendage screens will move from their original screens

TABLE 1

Enter
FOR EACH object designated in step 805
    calculate size and placement of an expansion region of
    original video screen which would encompass object's new TABLE 1-continued

```
    location when rendered
    IF new region is within expansion_bounds THEN
        IF consolidate_regions is TRUE
        AND the new region is within consolidation_range of
        another expansion region THEN
            consolidate new region with the
            other expansion regions;
        render new or consolidated region;
    ELSE IF object location is NOT within expansion_bounds
        AND tear_off_regions is TRUE THEN
        IF new region is within render_bounds THEN
            render new expansion region as separate video screen
    end the "FOR EACH" loop
Exit
```

What is claimed is:

1. A method for use in processing a view of a three dimensional world in which a first portion of said world is modeled as computer graphics and a second portion of said world is represented by a video on a video screen having a first configuration, said video screen existing in said first portion of said world, wherein said video is made up of a sequence of images, the method comprising the steps of:

determining that an object being displayed on said video screen has moved to a location that is no longer completely displayable on said video screen in said first configuration; and changing the configuration of said video screen to a second configuration so that said object can continue to be displayed on said video screen when it is configured in said second configuration.

2. The invention as defined in claim 1 wherein said second configuration is an enlarged version of said first configuration.

3. The invention as defined in claim 1 wherein, in said second configuration, said video screen is shaped differently than in said first configuration.

4. The invention as defined in claim 1 wherein, in said second configuration, said video screen is shaped differently and has a larger overall area than in said first configuration.

5. The invention as defined in claim 1 wherein, at least in said second configuration, said video screen has a plurality of disjoint sections.

6. The invention as defined in claim 1 wherein, at least in said second configuration, said video screen has a plurality of disjoint sections which are located substantially in the same plane.

7. The invention as defined in claim 1 wherein, at least in said second configuration, said video screen has a plurality of disjoint sections at least two of which are located substantially in different planes.

8. The invention as defined in claim 1 wherein, at least in said second configuration, said video screen has a plurality of disjoint sections, at least one of which is non-planar.

9. The invention as defined in claim 1 wherein, in at least one of said first and second configurations, said video screen has a non-planar section.

10. The invention as defined in claim 1 wherein said object has moved to a location in said three dimensional world that is at a location which is one or more of in front of, to the side of, above, or below, said video screen in said first configuration.

11. The invention as defined in claim 1 wherein said determining step includes the step of analyzing said video for changes in identifiable objects therein.

12. The invention as defined in claim 1 wherein said determining step includes the step of obtaining additional video for said object which is necessary to render said object on said video screen in said second configuration.

13. The invention as defined in claim 1 wherein said determining step includes the step of obtaining additional video for said object which is necessary to render said object on said video screen in said second configuration and wherein said additional information is associated with a frame of said video.

14. The invention as defined in claim 1 wherein said determining step includes the step of obtaining additional information identifying said object.

15. The invention as defined in claim 1 wherein said determining step includes the step of obtaining additional information and wherein said additional information includes information about said object in at least one category from the set of categories including spatial location, size, orientation, and motion information.

16. The invention as defined in claim 1 wherein said video screen is moving within said first portion of said world which is modeled as computer graphics.

17. The invention as defined in claim 1 wherein said object need not be completely displayed when said object, or a portion thereof, leaves the world.

18. A method for use in processing a view of a three dimensional world in which a first portion of said world is modeled as computer graphics and a second portion of said world is represented by a video on a video screen, wherein said video is made up of a sequence of images and said video screen exists in said first portion of said world, the method comprising the steps of:

determining that an object being represented by a video on said video screen has moved to a location that is being modeled as computer graphics; and enlarging said video screen so as to continue to display said object as video on said video screen.

19. The invention as defined in claim 18 wherein said enlargement is performed using a disjoint portion of said video screen.

20. The invention as defined in claim 18 wherein said video screen as enlarged need not have the same shape as said video screen prior to enlargement.

21. The invention as defined in claim 18 wherein said video screen is not uniformly enlarged.

22. The invention as defined in claim 18 wherein said video is displayed on a video screen which is moveable in said world and wherein said step of revealing is initiated by said video screen moving past said representation of said object as computer graphics.

23. The invention as defined in claim 18 only a portion of said video screen is enlarged.

24. Apparatus for use in processing a view of a three dimensional world in which a first portion of said world is modeled as computer graphics and a second portion of said world is represented by a video on a video screen, wherein said video is made up of a sequence of images and said video screen exists in said first Dortion of said world, said apparatus comprising:

means for determining that an object being represented by a video is undergoing movement to a location that is being modeled as computer graphics; and means for changing the configuration of said video screen so that said object can continue to be displayed on said video screen when it is configured in said second configuration.

25. The invention as defined in claim 24 further wherein said object has moved to a location in said three dimensional world that is at a location which is one or more of in front of, to the side of, above, or below, a screen on which said video is being rendered.

26. A system for displaying an apparently three dimensional world to a user, in which a first part of said three dimensional world is displayed as computer graphics and a second part of said three dimensional world is displayed as video on a video screen, said system comprising:

a processor for determining that an element displayed as video on said video screen is undergoing a transition from said second part to first second part of said three dimensional world given a first configuration of said video screen; and a rendering engine for displaying said world with a second configuration for said video screen so that said element continues to be visibly displayed in said second part of said world rather than in said first part of said world.

27. The invention as defined in claim 26 wherein rendering engine includes said processor.

* * * * *